(12) United States Patent
Zhou et al.

(10) Patent No.: US 9,276,470 B2
(45) Date of Patent: Mar. 1, 2016

(54) MULTIPHASE SWITCHING CONVERTERS OPERATING OVER WIDE LOAD RANGES

(71) Applicant: Maxim Integrated Products, Inc., San Jose, CA (US)

(72) Inventors: Xin Zhou, Nashua, NH (US); Serhii M. Zhak, North Andover, MA (US); Brett A. Miwa, Wellesley, MA (US)

(73) Assignee: Maxim Integrated Products, Inc., San Jose, CA (US)

( * ) Notice: Subject to any disclaimer, the term of this patent is extended or adjusted under 35 U.S.C. 154(b) by 168 days.

(21) Appl. No.: 13/930,760

(22) Filed: Jun. 28, 2013

(65) Prior Publication Data

US 2014/0062433 A1   Mar. 6, 2014

Related U.S. Application Data

(60) Provisional application No. 61/695,832, filed on Aug. 31, 2012.

(51) Int. Cl.
*G05F 1/00* (2006.01)
*H02M 3/158* (2006.01)

(52) U.S. Cl.
CPC ............ *H02M 3/158* (2013.01); *H02M 3/1584* (2013.01); *H02M 2003/1586* (2013.01)

(58) Field of Classification Search
CPC . H02M 3/1584; H02M 3/156; H02M 3/1588; H02M 3/157; H02M 2003/1586; H02M 2001/0032; H02M 3/158; H02M 2001/008; H03K 17/122; H03K 17/167; H03K 17/6871; H03K 5/1565

USPC ......... 323/271–272, 282–285, 212–215, 217, 323/237, 247; 363/65, 71–72

See application file for complete search history.

(56) References Cited

U.S. PATENT DOCUMENTS

| 6,433,525 | B2 | 8/2002 | Muratov et al. | |
|---|---|---|---|---|
| 8,358,117 | B1 * | 1/2013 | Chui et al. | 323/283 |
| 8,482,948 | B2 * | 7/2013 | Chen | 363/72 |
| 8,710,810 | B1 * | 4/2014 | McJimsey et al. | 323/272 |

(Continued)

FOREIGN PATENT DOCUMENTS

| CN | 101785173 A | 7/2010 |
|---|---|---|
| WO | WO-2009/020898 A2 | 2/2009 |

OTHER PUBLICATIONS

Office Action dated Jul. 25, 2014 from the German Patent Office for German Patent Application No. 10 2013 109 100.8.

(Continued)

*Primary Examiner* — Adolf Berhane
*Assistant Examiner* — Henry Lee, III

(57) ABSTRACT

A system includes a multi-phase switching converter and a converter control module. The multi-phase switching converter receives an input voltage and that supplies an output voltage to a load via a plurality of phases. Each phase includes a plurality of switches, an on-time generator module that determines an on-time of the switches, and a switch control module that controls a switching frequency of the switches based on the on-time and a clock signal, and an inductance that connects the switches to the load. The converter control module varies the switching frequency without varying the on-time or varies the on-time without varying the switching frequency when current through the load varies.

30 Claims, 17 Drawing Sheets

(56) References Cited

U.S. PATENT DOCUMENTS

| | | |
|---|---|---|
| 2002/0093320 A1 | 7/2002 | Van Auken |
| 2002/0125869 A1* | 9/2002 | Groom et al. ............. 323/283 |
| 2005/0184717 A1* | 8/2005 | Walters .................... 323/284 |
| 2007/0085520 A1 | 4/2007 | Ho |
| 2009/0040791 A1* | 2/2009 | Qahouq et al. ......... 363/21.01 |
| 2009/0256537 A1 | 10/2009 | Sato et al. |
| 2010/0007318 A1 | 1/2010 | Faerber |
| 2011/0080151 A1 | 4/2011 | Rahardjo et al. |
| 2012/0126775 A1 | 5/2012 | Hung et al. |

OTHER PUBLICATIONS

English Translation of Office Action dated Jul. 25, 2014 from the German Patent Office for German Patent Application No. 10 2013 109 100.8.

Jang, Yungtaek, Jovanovic, Milan M., and Panov, Yuri, "Multi-Phase Buck Converters with Extended Duty Cycle," 2006 IEEE, pp. 38-44.

Hegarty, Tim, National Semiconductor, Benefits of multiphasing buck converters—Part 1, Retrieved, Jun. 12, 2012, from http://www.eetimes.com/General/PrintView/4012204, Nov. 16, 2007.

Jakobsen, L. T., Garcia, O., Oliver, J. A., Alou, P., Cobos, J. A., and Andersen, M. A. E., "Interleaved Buck Converter with Variable Number of Active Phases and a Predictive Current Sharing Scheme," 2008 IEEE, pp. 3360-3365.

Taufik, Taufik, Prasetyo, Randyco, Hernadi, Arief, Garinto, Dodi, "Multiphase Interleaving Buck Converter With Input-Output Bypass Capacitor," 2010 IEEE, pp. 1207-1211.

Office Action dated Jul. 3, 2015 from the Chinese Patent Office for Chinese Patent Application No. 201310388595.8; 13 Pages.

English Translation of Office Action dated Jul. 3, 2015 from the Chinese Patent Office for Chinese Patent Application No. 201310388595.8; 17 Pages.

\* cited by examiner

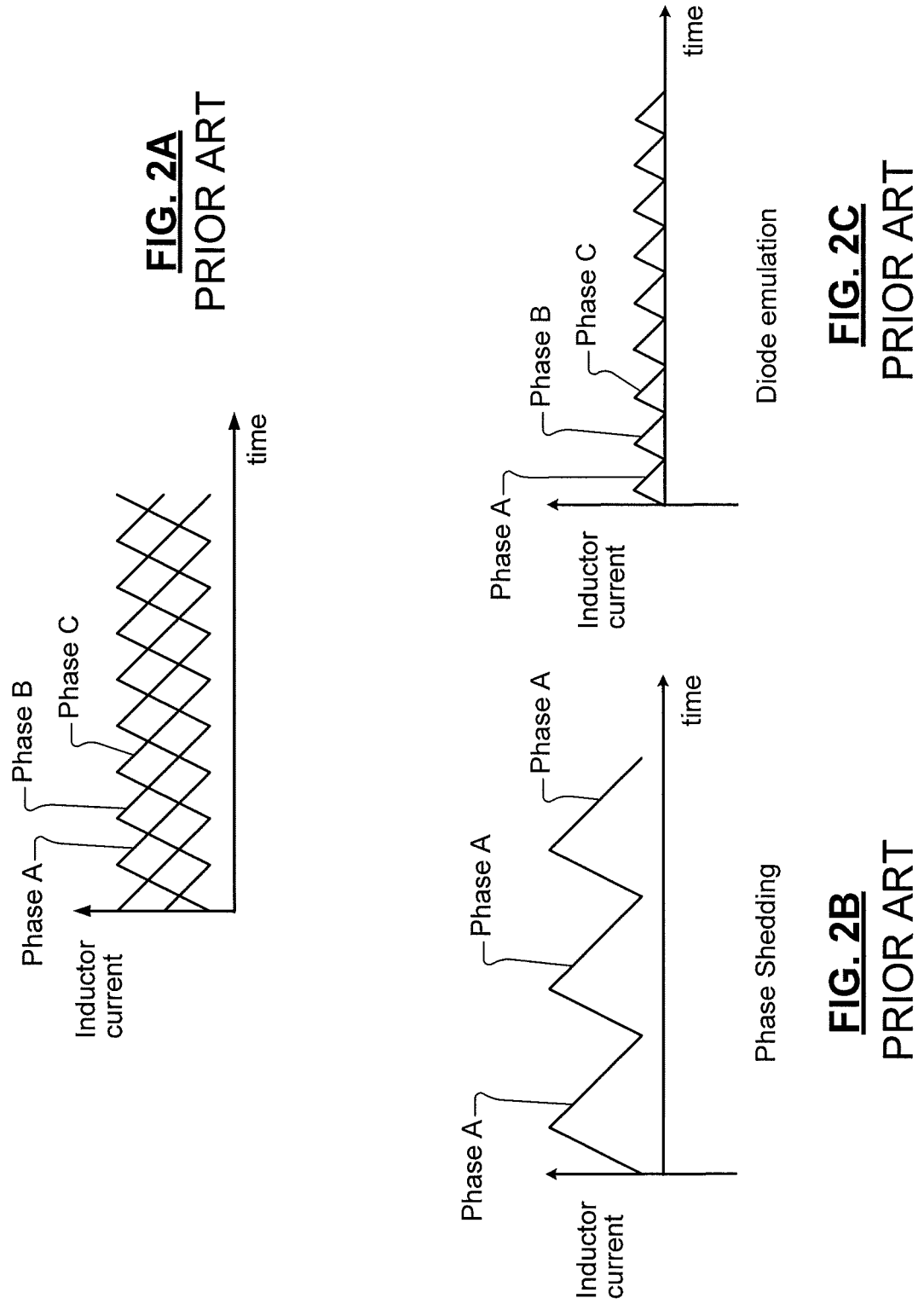

MULTIPHASE SWITCHING CONVERTERS OPERATING OVER WIDE LOAD RANGES

CROSS-REFERENCE TO RELATED APPLICATIONS

This application claims the benefit of U.S. Provisional Application No. 61/695,832 filed on Aug. 31, 2012. The entire disclosure of the application referenced above is incorporated herein by reference.

FIELD

The present disclosure relates generally to switching power supplies and more particularly to multiphase switching converters operating over wide load ranges.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Multiphase DC-to-DC converters provide acceptable ripple cancellation and high efficiency under heavy load conditions. The multiphase converters, however, do not provide acceptable ripple cancellation and high efficiency under light load conditions. Typically, phase shedding (turning off one or more phases) is used to maintain conversion efficiency at light loads. Phase shedding, however, creates output voltage transients during the shedding and reactivation of phases. Constant frequency diode emulation may be used to eliminate mode transitions and preserve ripple cancellation. When constant frequency diode emulation is used, however, the efficiency reduces at light loads.

SUMMARY

A system comprises a multi-phase switching converter and a converter control module. The multi-phase switching converter receives an input voltage and that supplies an output voltage to a load via a plurality of phases. Each phase includes a plurality of switches, an on-time generator module that determines an on-time of the switches, and a switch control module that controls a switching frequency of the switches based on the on-time and a clock signal, and an inductance that connects the switches to the load. The converter control module varies the switching frequency without varying the on-time or varies the on-time without varying the switching frequency when current through the load varies.

In other features, the converter control module comprises an error amplifier that generates an error voltage based on a reference voltage and the output voltage and a voltage controlled oscillator that generates the clock signal having a frequency based on the error voltage. The switching frequency is based on the frequency of the clock signal.

In another feature, when the multi-phase switching converter operates in a continuous conduction mode or in a discontinuous conduction mode, the converter control module varies the switching frequency without varying the on-time as current through the load varies.

In another feature, the converter control module comprises an on-time control module that generates a feed-forward control for the on-time based on the error voltage and a clamping voltage, where the clamping voltage is the error voltage at critical conduction.

In another feature, when the multi-phase switching converter operates in a continuous conduction mode, the converter control module varies the on-time without varying the switching frequency as current through the load varies.

In another feature, when the multi-phase switching converter operates in a discontinuous conduction mode, the converter control module varies the switching frequency without varying the on-time as current through the load varies.

In other features, the converter control module comprises a voltage controlled oscillator that generates the clock signal having a frequency, where the switching frequency is based on the frequency of the clock signal, and a comparator that compares the output voltage to a reference voltage and that generates a control signal based on the comparison, where the control signal determines the on-time.

In another feature, when the multi-phase switching converter operates in a continuous conduction mode, the converter control module varies the switching frequency without varying the on-time as current through the load varies.

In another feature, when the multi-phase switching converter operates in a continuous conduction mode, the converter control module varies the on-time without varying the switching frequency as current through the load varies.

In another feature, the converter control module comprises a mode control module that switches mode of the multi-phase switching converter to a skip mode where current through the load is less than or equal to a predetermined value when currents through the inductances of the plurality of phases are non-overlapping.

In another feature, the converter control module operates the multi-phase switching converter using the phases in a predetermined order.

In another feature, the converter control module operates the multi-phase switching converter using less than all of the phases.

In another feature, the on-time generator module scales the on-time based on current through the load.

In other features, the system further comprises an oscillator that generates the clock signal having a frequency, where the switching frequency is based on the frequency of the clock signal, and an error amplifier that generates an error voltage based on a reference voltage and the output voltage, where the on-time generator module determines the on-time based on the error voltage.

In other features, one of the plurality of phases is a master phase, and wherein others of the plurality of phases are slave phases.

In another feature, after critical conduction, the converter control module maintains current through the inductance of the master phase at a critical conduction value and reduces current through the inductances of the slave phases.

In another feature, the master phase comprises a current detection module that detects current through the load and that turns off one of the plurality of switches when the current approaches zero.

In another feature, the system further comprises a phase drop/add module that drops/adds the slave phases based on respective inductor currents.

In another feature, when the multi-phase switching converter operates in a continuous conduction mode, the converter control module varies the on-time without varying the switching frequency as current through the load varies.

In another feature, after critical conduction, the converter control module maintains the on-time and the switching frequency in the master phase and maintains the switching frequency in the slave phases as current through the load varies.

In another feature, the converter control module reduces peak inductor current to reduce ripple.

In other features, when an average inductor current in the slave phases is less than or equal to zero, the converter control module (i) drops the slave phases, (ii) operates the master phase in a skip mode where current through the load is less than or equal to a predetermined value, and (iii) varies the switching frequency of the switches in the master phase as current through the load varies while maintaining peak inductor current.

In another feature, the converter control module adds the slave phases when inductor current in the master phase is greater than zero.

In still other features, a method comprises supplying an output voltage to a load via a plurality of phases of a multi-phase switching converter, where each phase comprises a plurality of switches and an inductance connecting the switches to the load. The method further comprises determining an on-time of the switches and controlling a switching frequency of the switches based on the on-time and a clock signal. The method further comprises varying the switching frequency without varying the on-time or varying the on-time without varying the switching frequency when current through the load varies.

In other features, the method further comprises generating an error voltage based on a reference voltage and the output voltage, generating the clock signal having a frequency based on the error voltage, and determining the switching frequency based on the frequency of the clock signal.

In another feature, the method further comprises varying the switching frequency without varying the on-time as current through the load varies when the multi-phase switching converter operates in a continuous conduction mode or in a discontinuous conduction mode.

In another feature, the method further comprises generating a feed-forward control for the on-time based on the error voltage and a clamping voltage, where the clamping voltage is equal to the error voltage at critical conduction.

In other features, the method further comprises varying the on-time without varying the switching frequency as current through the load varies when the multi-phase switching converter operates in a continuous conduction mode, and varying the switching frequency without varying the on-time as current through the load varies when the multi-phase switching converter operates in a discontinuous conduction mode.

In other features, the method further comprises generating the clock signal having a frequency, determining the switching frequency based on the frequency of the clock signal, comparing the output voltage to a reference voltage, generating a control signal based on the comparison, and determining the on-time based on the control signal.

In other features, the method further comprises, when the multi-phase switching converter operates in a continuous conduction mode, varying the switching frequency without varying the on-time as current through the load varies, or varying the on-time without varying the switching frequency as current through the load varies.

In another feature, the method further comprises switching mode of the multi-phase switching converter to a skip mode where current through the load is less than or equal to a predetermined value when currents through the inductances of the plurality of phases are non-overlapping.

In other features, the method further comprises operating the multi-phase switching converter using the phases in a predetermined order, or operating the multi-phase switching converter using less than all of the phases.

In another feature, the method further comprises scaling the on-time based on current through the load.

In other features, one of the plurality of phases is a master phase, and others of the plurality of phases are slave phases, and the method further comprises generating the clock signal having a frequency, determining the switching frequency based on the frequency of the clock signal, generating an error voltage based on a reference voltage and the output voltage, and determining the on-time based on the error voltage.

In other features, the method further comprises, after critical conduction, maintaining current through the inductance of the master phase at a critical conduction value, and reducing current through the inductances of the slave phases.

In other features, the method further comprises, in the master phase, detecting current through the load, and turning off one of the plurality of switches when the current approaches zero.

In another feature, the method further comprises dropping/adding the slave phases based on respective inductor currents.

In another feature, the method further comprises varying the on-time without varying the switching frequency as current through the load varies when the multi-phase switching converter operates in a continuous conduction mode.

In other features, the method further comprises, after critical conduction, maintaining the on-time and the switching frequency in the master phase, and maintaining the switching frequency in the slave phases as current through the load varies.

In another feature, the method further comprises reducing peak inductor current to reduce ripple.

In other features, the method further comprises, when an average inductor current in the slave phases is less than or equal to zero, dropping the slave phases, operating the master phase in a skip mode where current through the load is less than or equal to a predetermined value, and varying the switching frequency of the switches in the master phase as current through the load varies while maintaining peak inductor current.

In another feature, the method further comprises adding the slave phases when inductor current in the master phase is greater than zero.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-2C depict inductor current waveforms for multiphase switching converters using phase shedding at different load conditions and using diode emulation;

DETAILED DESCRIPTION

The present disclosure relates to multiphase switching converters that provide high efficiency and low ripple over a wide range of loads. Specifically, the multiphase switching converters according to the present disclosure provide ripple cancellation over a wider load range compared to phase shedding and provide the high efficiency of single-phase converters at light loads. Additionally, the multiphase switching converters provide seamless (transient-free) transitions between three distinct regions of operation across wide load ranges: continuous conduction (continuous current mode or CCM) at heavy loads, discontinuous conduction (discontinuous current mode or DCM) at medium loads, and pulse frequency modulation (PFM) at light loads.

Figure 1A:
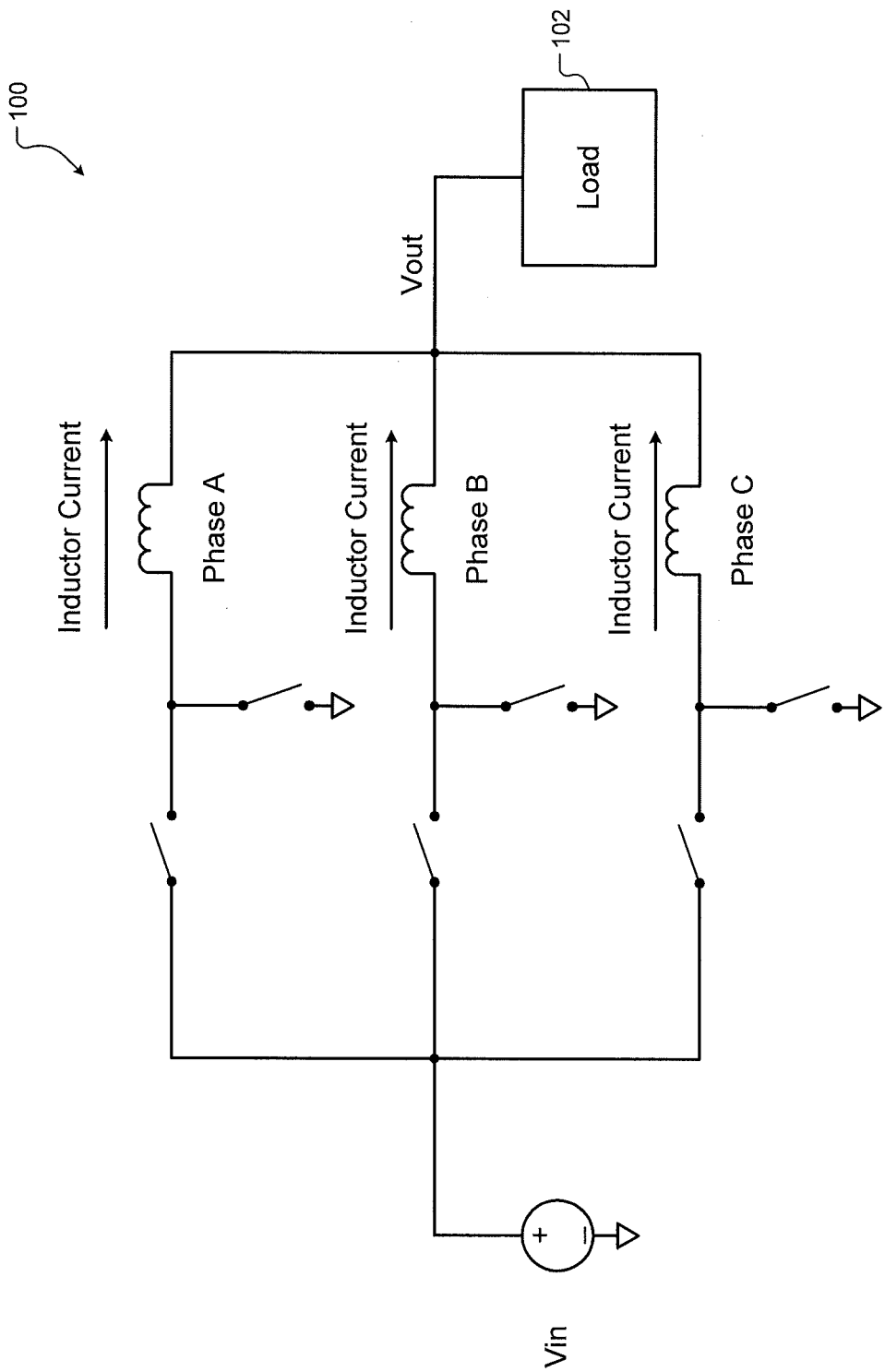
FIG. 1A depicts a schematic of a multiphase switching converter.
Figure 1B:
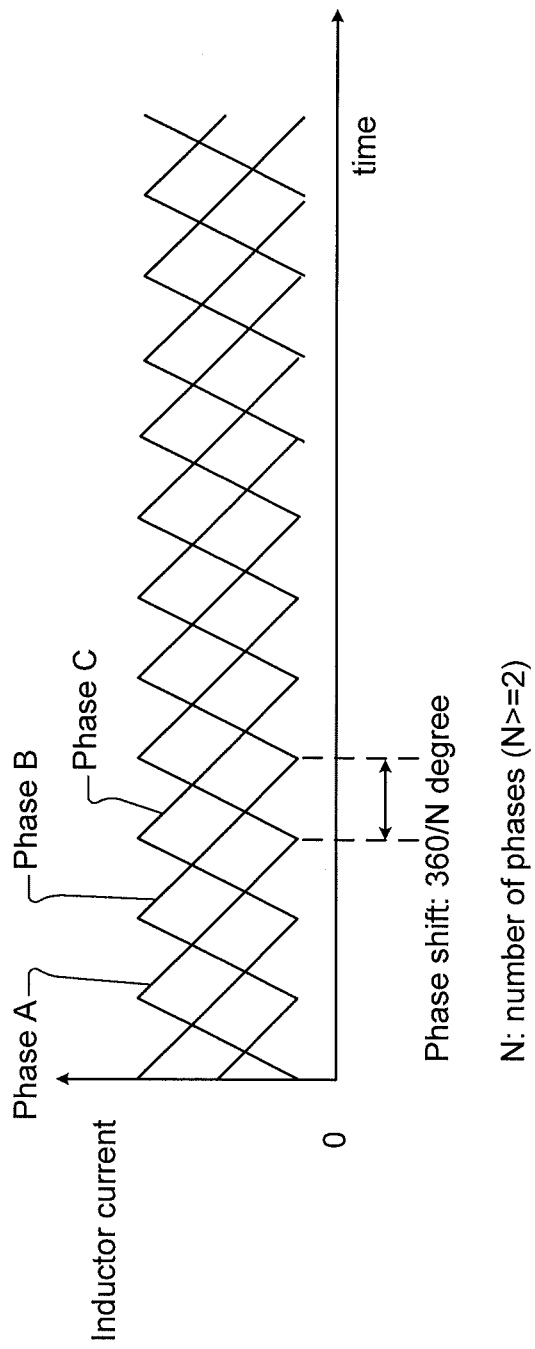
FIG. 1B depicts inductor current waveforms for the multiphase switching converter of FIG. 1A.

Referring now to FIGS. 1A and 1B, a multiphase switching converter 100 is shown. In FIG. 1A, for example only, the multiphase switching converter 100 is shown as a three-phase converter that receives an input voltage $V_{in}$ and supplies an output voltage $V_{out}$ to a load 102 via three phases A, B, and C. In FIG. 1B, inductor currents for the three phases are shown. In general, a phase shift between the inductor currents of adjacent phases is 360/N degrees, where N is an integer greater than 1 and denotes a number of phases. The multiphase switching converter 100 provides benefits including a small total inductor size, acceptable ripple cancellation, fast transient response, and high efficiency.

Referring now to FIGS. 2A-2C, ripple and efficiency of multiphase switching converters using phase shedding at different load conditions are shown. In FIG. 2A, multiphase switching converters using phase shedding provide acceptable ripple at heavy loads. In FIG. 2B, multiphase switching converters using phase shedding provide acceptable efficiency but high ripple at light loads. In FIG. 2C, multiphase switching converters using diode emulation continue to operate using all the phases at light loads by delivering only a portion of energy in each phase. Accordingly, multiphase switching converters using diode emulation provide low ripple but low efficiency at light loads.

Figure 3:
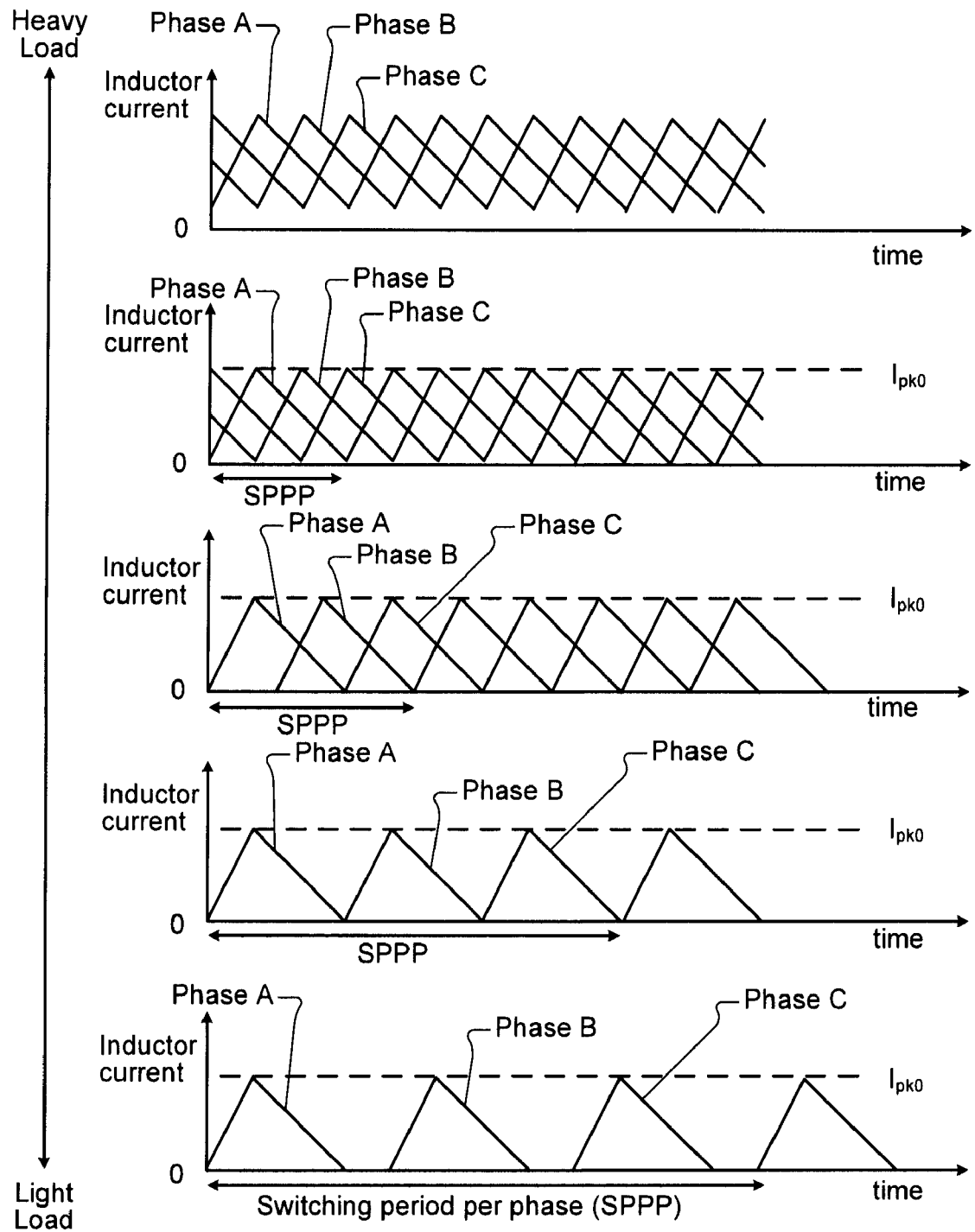
FIG. 3 depicts inductor current waveforms for a multiphase switching converter having high efficiency and low ripple over a wide load range.

Referring now to FIG. 3, both high efficiency and low ripple can be achieved in multiphase switching converters while load condition changes from heavy load to light load as shown. All the phases are on and have the same amplitude regardless of changes in the load condition as shown. Accordingly, a large amount of energy is delivered to the load per cycle. As the load changes from heavy to light, less power is delivered while maintaining all the phases and amplitudes. Less power is delivered by delivering pulses less frequently.

Generally, this can be accomplished using SKIP mode, which relies on output voltage ripple information to determine when to deliver the next pulse. In some operating modes, however, information about output voltage ripple is unavailable. Instead, as explained below, an error voltage is generated based on the output voltage and a reference voltage, and a voltage controlled oscillator (VCO) is used to change the switching frequency based on the error voltage. The VCO changes the switching frequency as a function of the error voltage. The transition from a fixed high-frequency operation at heavy load to a variable lower frequency operation at light load is seamless. The SKIP mode functionality is achieved without having information about output voltage ripple.

Essentially, peak current mode control is used at heavy load, VCO mode or voltage mode control is used at medium load, and pulse frequency modulation (PFM) mode or hysteretic output voltage control is used when the pulses are non-overlapping at light load. To seamlessly transition between the control modes, an internal calibration is performed in real time to maintain the ripple amplitude the same in the each control mode.

Figure 4A:
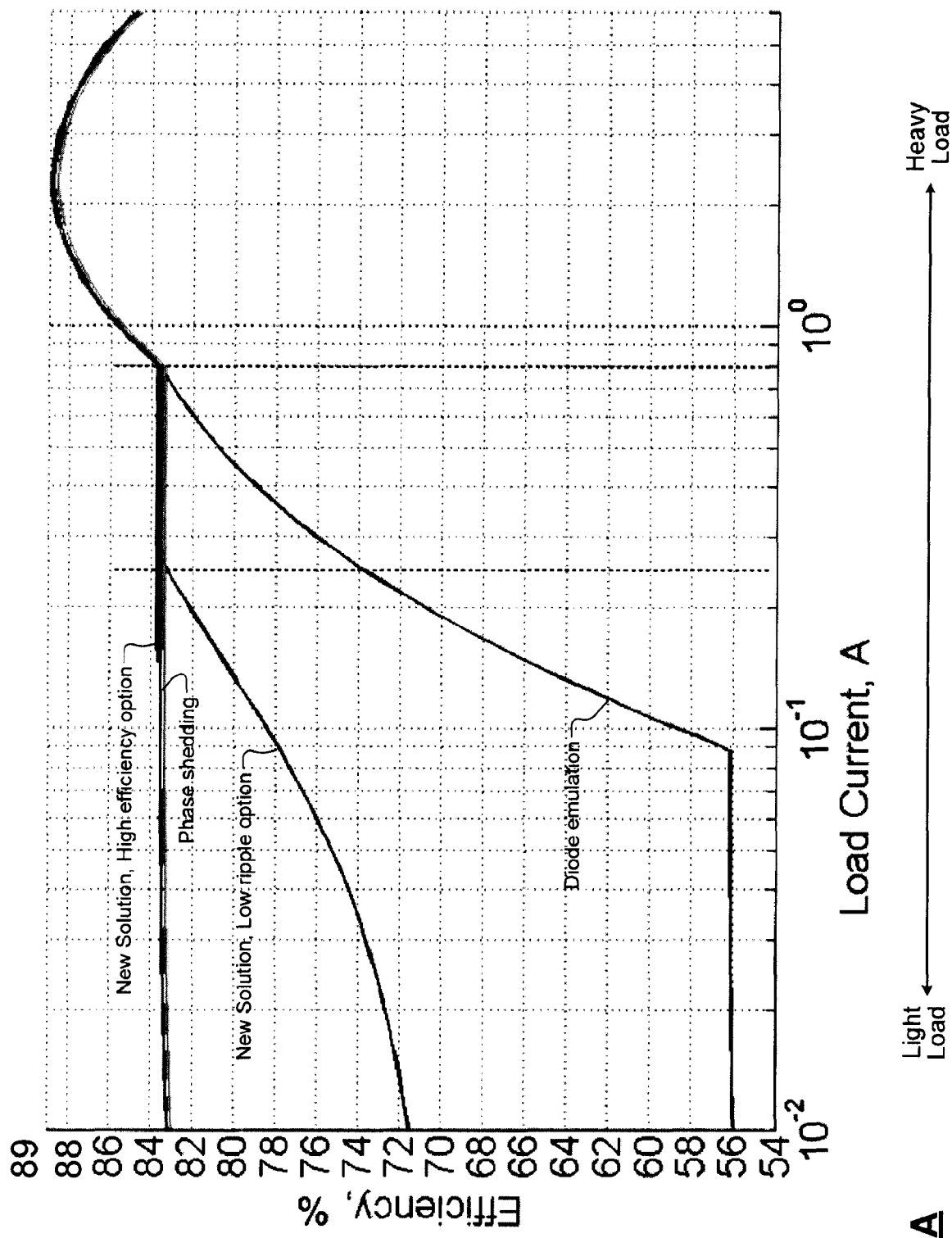
FIG. 4A depicts efficiency as a function of load current for different types of multiphase switching converters.
Figure 4B:
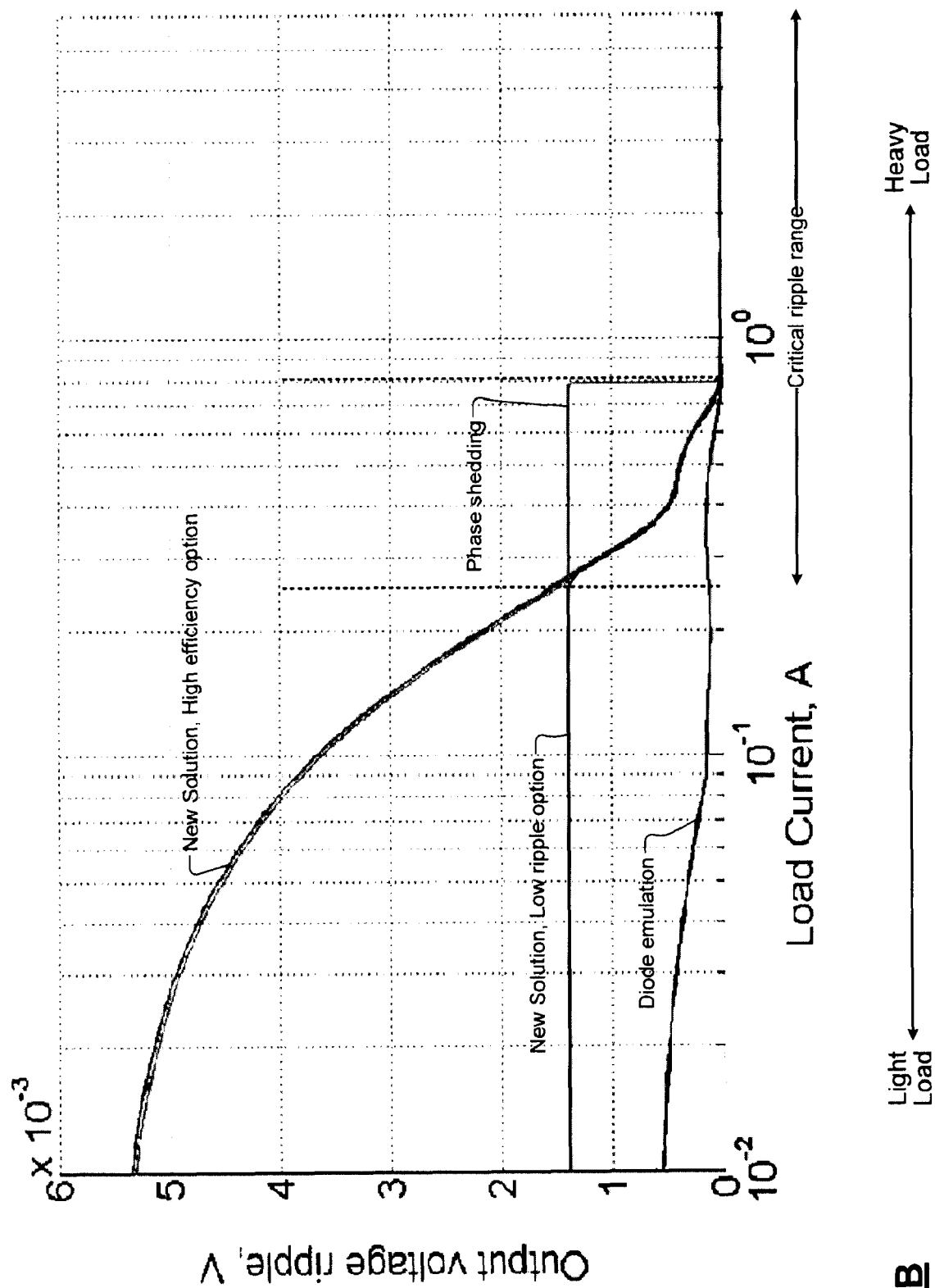
FIG. 4B depicts output voltage ripple as a function of load current for different types of multiphase switching converters.

Referring now to FIGS. 4A and 4B, efficiency and ripple of different types of multiphase switching converters are compared. In FIG. 4A, efficiency of the multiphase switching converters according to the present disclosure (i.e., new solution) is compared to efficiencies of multiphase switching converters using phase shedding and diode emulation. In FIG. 4B, ripple of the multiphase switching converters according to the present disclosure (i.e., new solution) is compared to efficiencies of multiphase switching converters using phase shedding and diode emulation.

The multiphase switching converters of the present disclosure provide high efficiency, low ripple, and seamless transition by operating in one of three types of variable frequency modes while maintaining interleaving (i.e., overlapping inductor currents across all phases): In a first variable frequency mode, the switching frequency of the converter is reduced as the load current decreases. In a second variable frequency mode, the inductor peak current is held substantially constant as the load current decreases. In a third variable frequency mode, a sum of conduction times (on-times) of controlled and synchronous switches of the converter is held substantially constant as the load current decreases.

The first variable frequency mode is used for medium loads instead of using phase shedding or diode emulation. All phases are active and full energy per pulse is delivered except that the number of pulses delivered is reduced as load decreases. This operation is analogous to pulse frequency modulation (PFM) except that PFM is based on SKIP mode, which cannot be implemented in this region (medium load) due to absence of information about output voltage ripple at medium load.

Figure 5A:
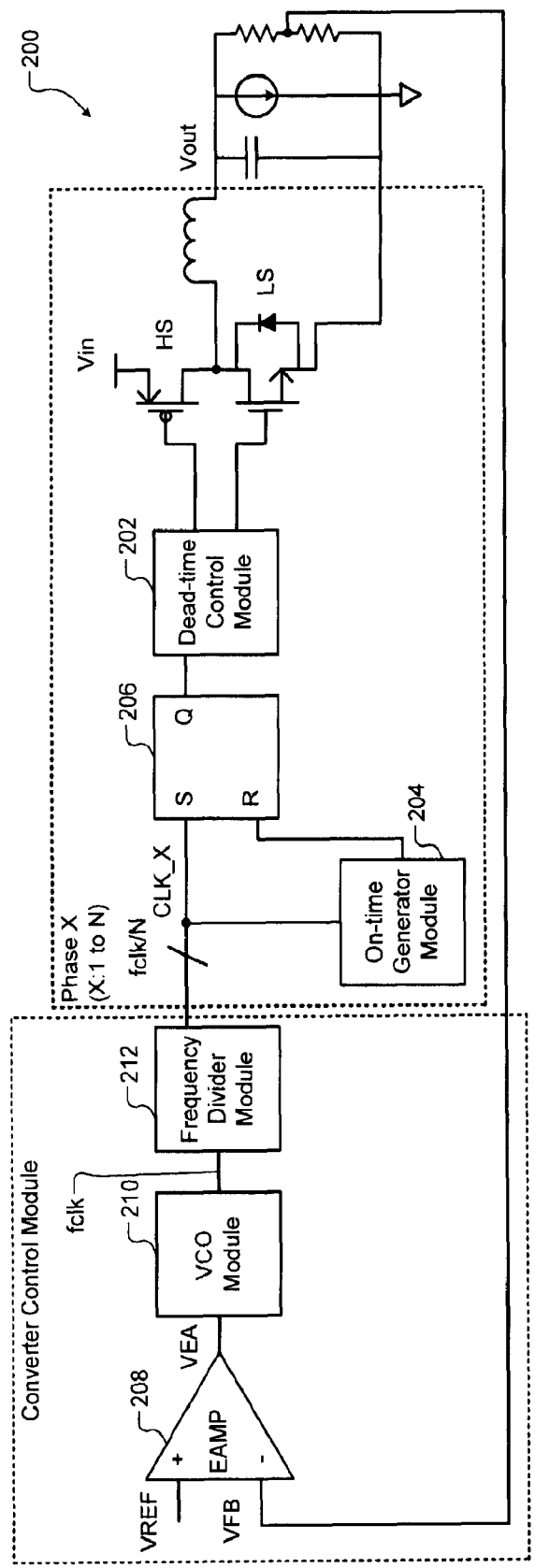
FIG. 5A is a functional block diagram of a multiphase switching converter using a voltage controlled oscillator (VCO) mode control with constant on-time and variable frequency.
Figure 5B:
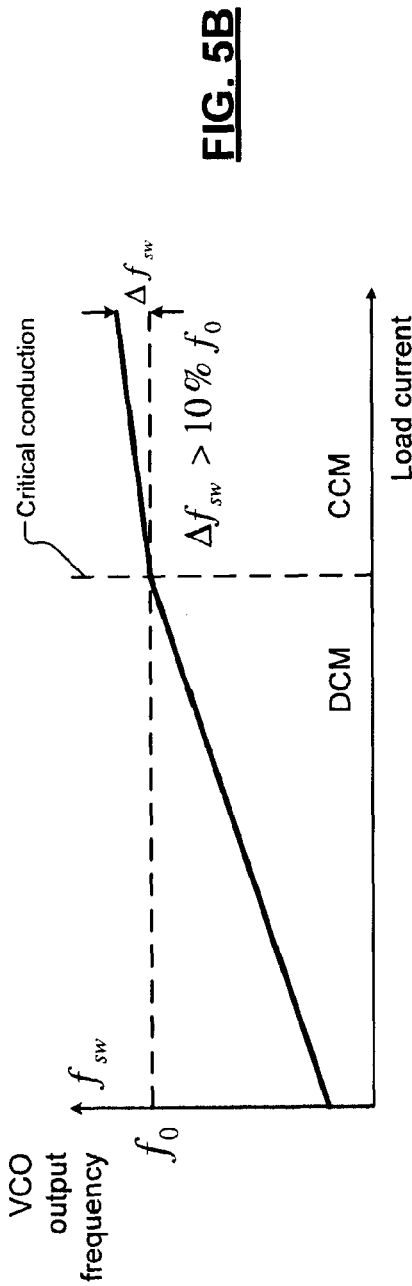
FIG. 5B depicts switching frequency of the multiphase switching converter of FIG. 5A as a function of load current.

Referring now to FIGS. 5A and 5B, a multiphase switching converter 200 using a VCO mode control with constant on-time and variable frequency is shown. The multiphase switching converter 200 uses VCO mode control to maintain the on-time of the switches constant while varying the switching frequency as the load changes. In FIG. 5A, the multiphase switching converter 200 includes N phases, where N is an integer greater than or equal to 1. Details of only one phase X are shown for simplicity of illustration.

The multiphase switching converter 200 includes high-side (HS) and low-side (LS) switches and an inductor connected as shown. The switches are controlled by a dead-time control module 202. The multiphase switching converter 200 receives an input voltage $V_{in}$ and generates an output voltage $V_{out}$. The multiphase switching converter 200 includes an on-time generator module 204 and a flip-flop 206. The on-time generator module 204 can generate a constant on-time for the switches or estimate the on-time based on input/output voltage or current of the multiphase switching converter 200.

The multiphase switching converter 200 further includes an error amplifier 208, a VCO module 210, and a frequency divider module 212, which may be collectively referred to as a converter control module. The error amplifier 208 generates an error voltage $V_{ea}$ based on a reference voltage $V_{ref}$ and a feedback voltage $V_{fb}$ received from the output of the multiphase switching converter 200 as shown. The VCO module 210 generates a clock having a frequency $f_{clk}$ based on the error voltage $V_{ea}$. The frequency divider module 212 divides the frequency $f_{clk}$ of the clock by the number of phases N and generates a divided clock having a frequency $f_{clk}/N$. The divided clock is supplied to the on-time generator module 204 and the flip-flop 206 of each phase. The dead-time control module 202 controls the switches based on the output of the flip-flop 206.

In FIG. 5B, a graph of VCO output frequency, which determines a switching frequency $f_{sw}$ of the multiphase switching converter 200, as a function of the load current is shown. The graph shows variation in the switching frequency $f_{sw}$ as the load varies when the multiphase switching converter 200 operates in discontinuous conduction (DCM) and continuous conduction (CCM) regions.

Figure 6A:
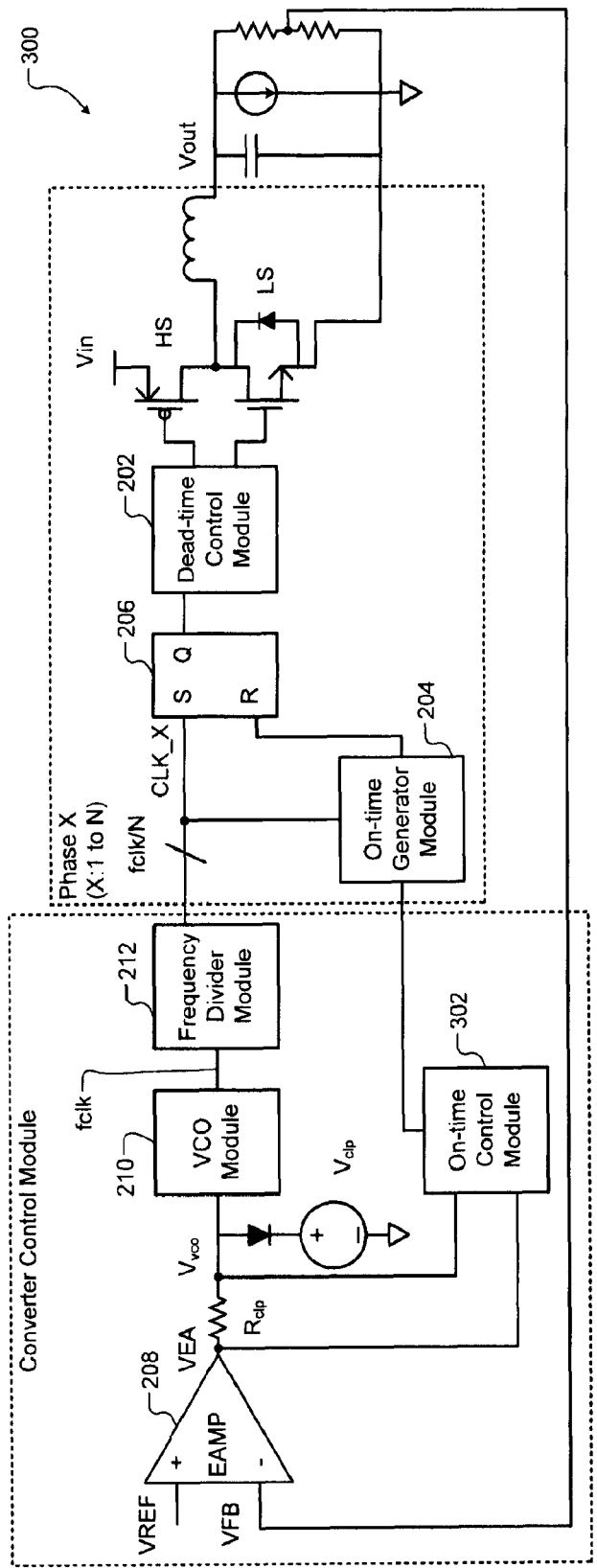
FIG. 6A is a functional block diagram of a multiphase switching converter using a VCO mode control with on-time adjustment in continuous conduction (CCM) region.
Figure 6B:
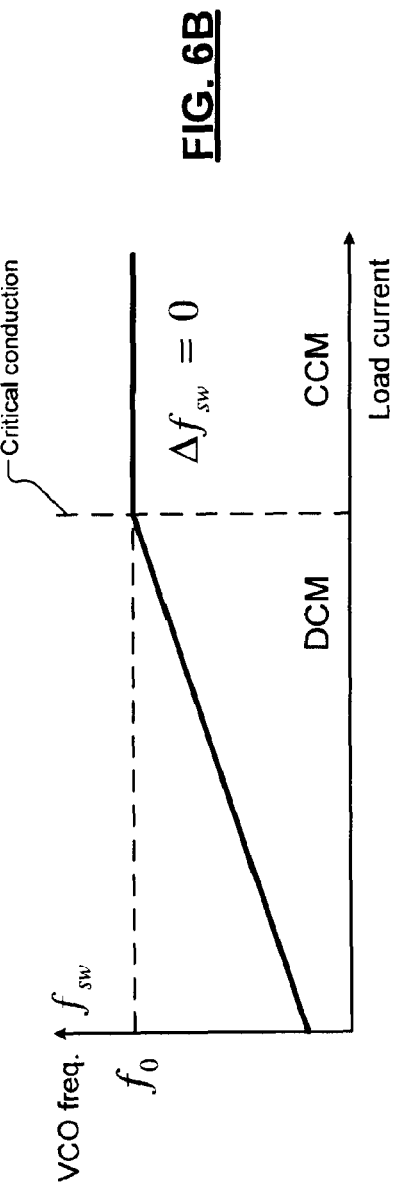
FIG. 6B depicts switching frequency of the multiphase switching converter of FIG. 6A as a function of load current.

Referring now to FIGS. 6A and 6B, a multiphase switching converter 300 using a VCO mode control with on-time adjustment in continuous conduction (CCM) region is shown. In FIG. 6A, the multiphase switching converter 300 includes all the elements of the multiphase switching converter 200 shown in FIG. 5A except that the error amplifier 208 is connected to the VCO module 210 as shown. Additionally, the converter control module of the multiphase switching converter 300 includes an on-time control module 302 that provides a feed-forward control for the on-time of the switches based on a clamp voltage $V_{clp}$ and the error voltage $V_{ea}$. The on-time control module 302 provides the feed-forward control to the on-time generator module 204 of each phase. The clamp voltage $V_{clp}$ is equal to the error voltage $V_{ea}$ at critical conduction. Critical conduction is a point in time when the valley of the inductor current approaches zero.

The switching frequency $f_{sw}$ in CCM mode is clamped to be constant. In the CCM mode, when load changes, the on-time of the switches is adjusted instead of adjusting the switching frequency $f_{sw}$. The switching frequency $f_{sw}$ in DCM mode is adjusted by the VCO according to the difference between the error voltage $V_{ea}$ and the clamp voltage $V_{clp}$. In DCM mode, the on-time is kept constant. In CCM mode, the on-time is adjusted to maintain regulation. At heavy loads, losses increase, and the on-time is increased in proportion to the losses. Conversely, at light loads, losses decrease, and the on-time is reduced in proportion to the losses.

In FIG. 6B, a graph of VCO output frequency, which determines the switching frequency $f_{sw}$ of the multiphase switching converter 300, as a function of the load current is shown. The graph shows variation in the switching frequency $f_{sw}$ as the load varies when the multiphase switching converter 300 operates in discontinuous conduction (DCM) region. The graph also shows no variation in the switching frequency $f_{sw}$ as the load varies when the multiphase switching converter 300 operates in continuous conduction (CCM) region.

Figure 7A:
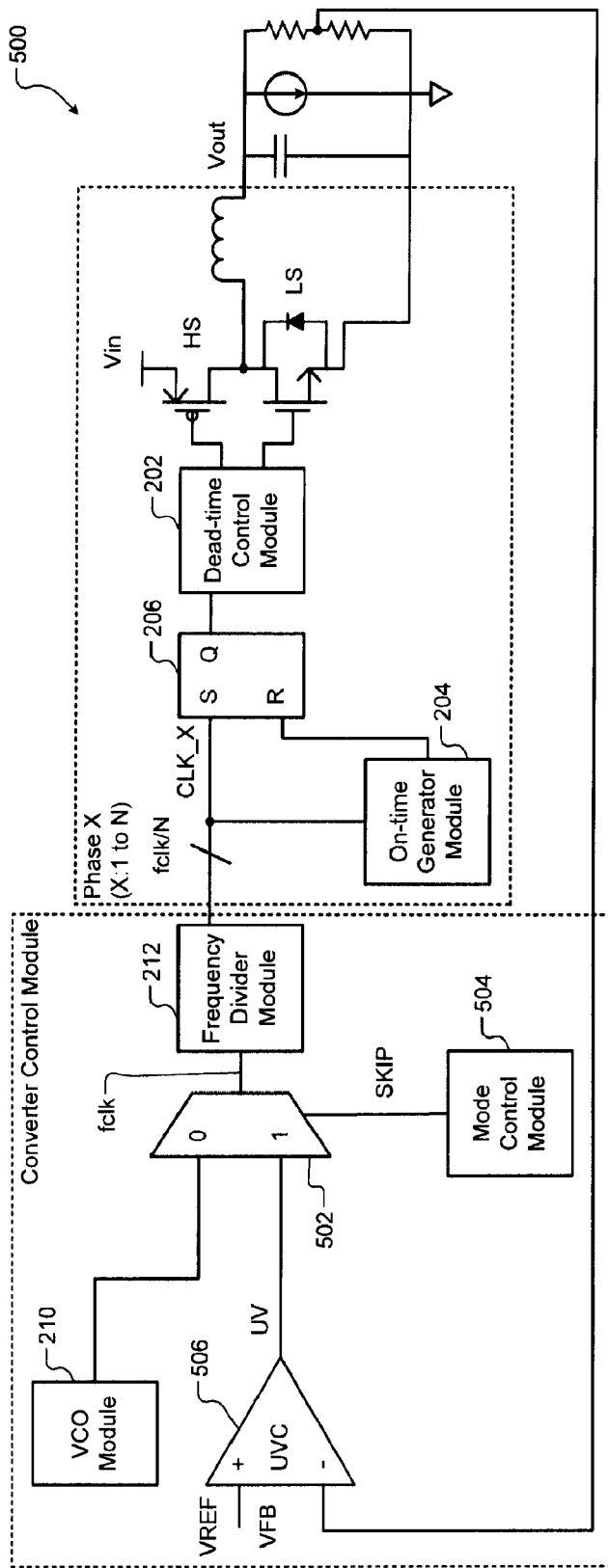
FIG. 7A is a functional block diagram of a multiphase switching converter using a VCO mode control with SKIP mode at extremely light loads.
Figure 7B:
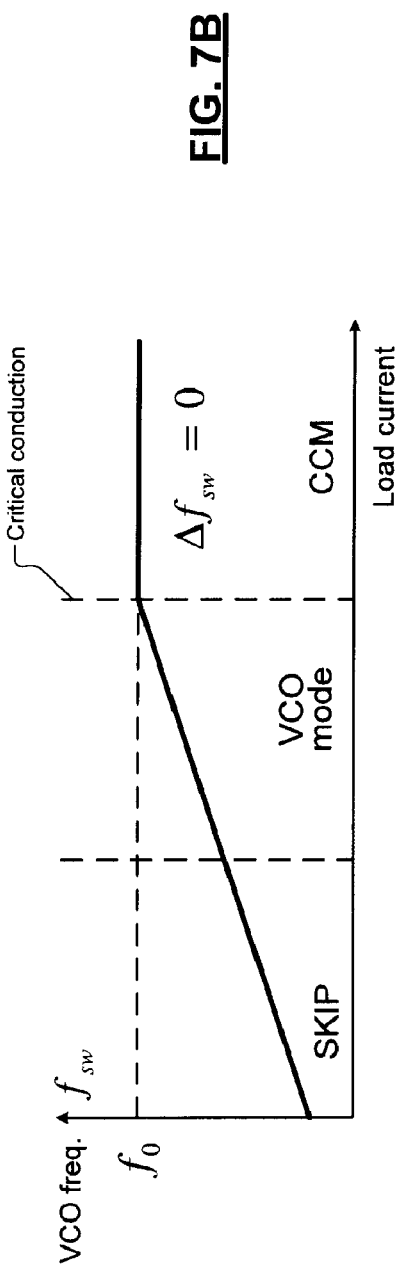
FIG. 7B depicts switching frequency of the multiphase switching converter of FIG. 7A as a function of load current.

Referring now to FIGS. 7A and 7B, a multiphase switching converter 500 using a VCO mode control with SKIP mode at extremely light loads is shown. In FIG. 7A, the multiphase switching converter 500 includes all the elements of the multiphase switching converter 200 shown in FIG. 5A except the following: In the converter control module of the multiphase switching converter 500, the error amplifier 208 is replaced by an under-voltage comparator 506 for SKIP mode, and the VCO module 210 and the under-voltage comparator 506 are connected to the frequency divider module 212 via a multiplexer 502. The under-voltage comparator 506 compares the feedback voltage to the reference voltage and generates a pulse that determines the on-time of the switches. Additionally, the converter control module of the multiphase switching converter 500 includes a mode control module 504 that controls the multiplexer 502. The mode control module 504 determines when to switch modes based on inductor current.

In the CCM mode, any control described with reference to FIGS. 5A-6B may be used. The multiphase switching converter 500 can enter SKIP mode control at extremely light load after the inductor current of each phase is not interleaved (i.e., non-overlapping). Specifically, the mode control module 504 switches mode to SKIP mode at extremely light load based on the inductor current. For example, the mode control module 504 switches mode to SKIP mode when the inductor currents of the phases are non-overlapping. Alternatively, the mode control module 504 switches mode to SKIP mode when the inductor currents of the phases are non-overlapping and when the inductor currents of adjacent phases have a predetermined phase difference. Other criteria in addition to non-overlapping inductor currents may be used.

In SKIP mode, the multiphase switching converter 500 can operate using the phases in different orders. For example, one order may be ABC . . . ABC, where when phase A is active, phases B and C are inactive; when phase B is active, phases A and C are inactive; when phase C is active, phases A and B are inactive, and so on. Alternatively, the multiphase switching converter 500 could drop other phases. For example, if phase A is used and phases B and C are dropped, then phase A is used in place of the dropped phases B and C. Accordingly, the order may be AAA . . . . In SKIP mode, the on-time can be equal to the on-time in the VCO mode. Hysteresis can be added to the on-time in SKIP mode to avoid mode chattering. The on-time in SKIP mode can be scaled down with the load current to achieve constant ripple in $V_{out}$. Ripple can be reduced by reducing peak inductor current $I_{pk}$ (e.g., to $I_{pk}/2$ as shown in FIG. 9B below).

In FIG. 7B, a graph of VCO output frequency, which determines the switching frequency $f_{sw}$ of the multiphase switching converter 500, as a function of the load current is shown. The graph shows variation in the switching frequency $f_{sw}$ as the load varies when the multiphase switching converter 500 operates in discontinuous conduction (DCM) and VCO mode regions. The graph also shows no variation in the switching frequency $f_{sw}$ as the load varies when the multiphase switching converter 500 operates in continuous conduction (CCM) region.

Figure 8A:
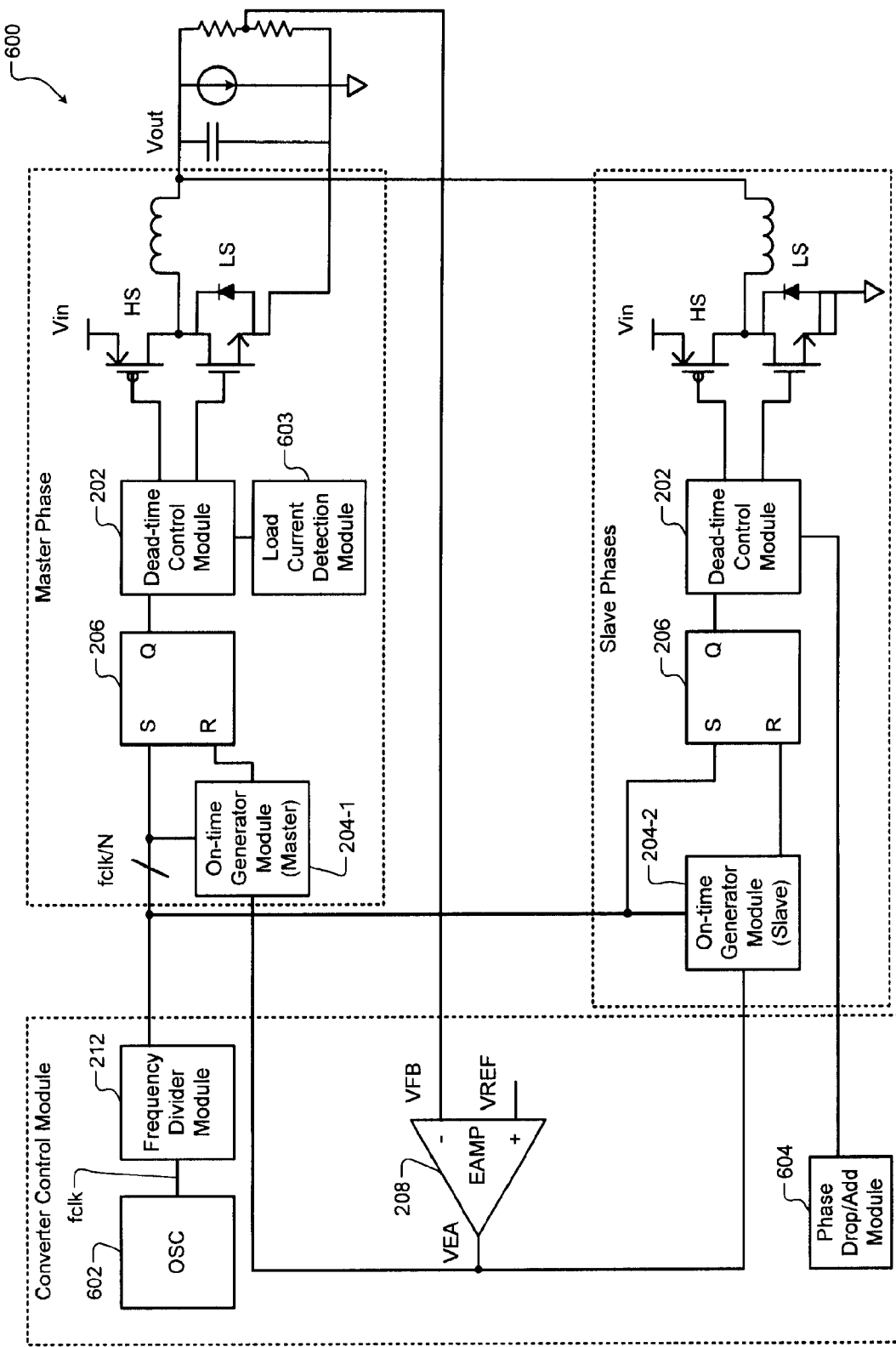
FIG. 8A is a functional block diagram of a multiphase switching converter using a master/slave control.
Figure 8B:
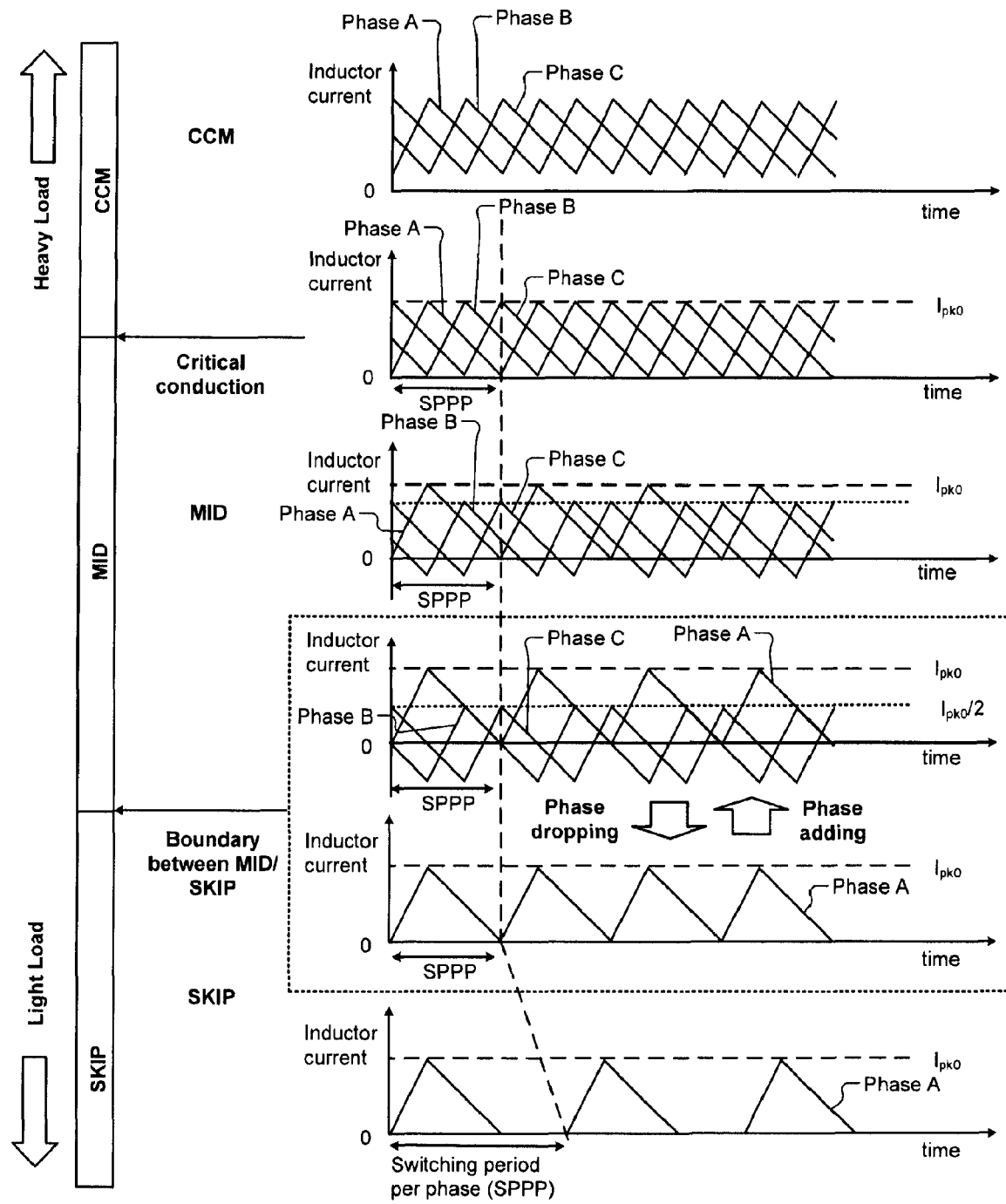
FIG. 8B depicts inductor current waveforms for the multiphase switching converter of FIG. 8A.

Referring now to FIGS. 8A and 8B, a multiphase switching converter 600 using a master/slave control is shown. The multiphase switching converter 600 includes all the elements of the multiphase switching converter 200 shown in FIG. 5A except the following: Only one of the phases is a master phase, and other phases are slave phases. In the converter control module of the multiphase switching converter 600, an oscillator 602 is used instead of the VCO module 210. The master phase includes an on-time generator module 204-1 that is different than an on-time generator module 204-2 included in the slave phases. Due to the difference, after critical conduction, the inductor peak current $I_{pk}$ in the master phase is maintained at the same value as in the critical conduction case while the inductor peak currents $I_{pk}$ in the slave phases are dropped to achieve regulation. The output of the error amplifier 208 is connected to the on-time generator modules 204-1 and 204-2 instead of to the VCO module 210.

Additionally, the master phase includes a load current detection module 603 that detects load current and that turns off the low-side switch when the inductor current approaches zero. The inductor of each slave phase is connected to the inductor of the master phase as shown. Further, the converter control module of the multiphase switching converter 600 includes a phase drop/add module 604 that adds/drops the slave phases based on the inductor current (e.g., when the inductor current in slave phases drops below zero).

For example, as shown in FIG. 8B, in CCM region, current mode control is used to maintain constant switching frequency. After critical conduction, the master phase maintains constant on-time and constant switching frequency, and the slave phases operate using current mode control to maintain constant switching frequency. As average inductor current in slave phases drops below zero, the slave phases are dropped, and the master phase enters SKIP mode.

The master/slave control provides the following benefits: acceptable efficiency at light load, acceptable ripple cancellation before phase drop, and none or slight transient. At medium load, however, the efficiency is low. In FIG. 8B, at medium load (MID region), the master phase (e.g., phase A) has constant peak inductor current and constant switching frequency (see the third set of waveforms from the top). The slave phases (e.g., phases B and C) have variable peak inductor current and constant switching frequency. At the boundary between medium load and light load (MID/SKIP region), phase dropping and phase adding are shown in a dotted box. The slave phases are dropped when the average current $I_{avg}$ for the slave phases is less than or equal to zero. With only the master phase operating, the peak inductor current can be kept constant and the switching frequency can be varied as explained before. The slave phases are added when the inductor current of the master phase is greater than zero (no zero crossing). At extremely light loads (SKIP region, where load current is less than or equal to a predetermined value), only the master phase is active with constant peak inductor current and variable switching frequency (see the last set of waveforms shown at the bottom).

Figure 9A:
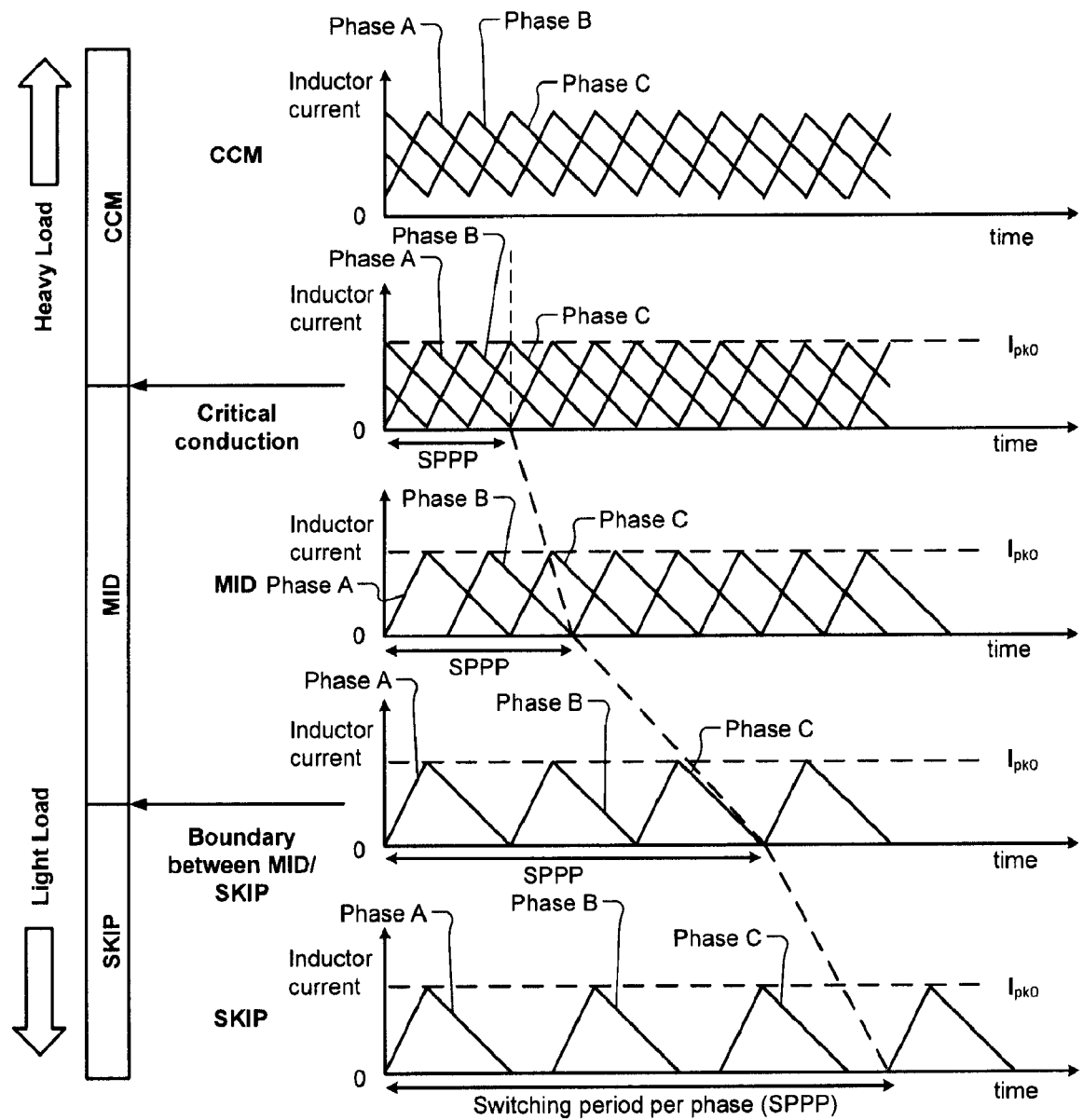
FIGS. 9A and 9B depict inductor current waveforms for multiphase switching converters with high-efficiency option and low ripple option over a wide load range.
Figure 9B:
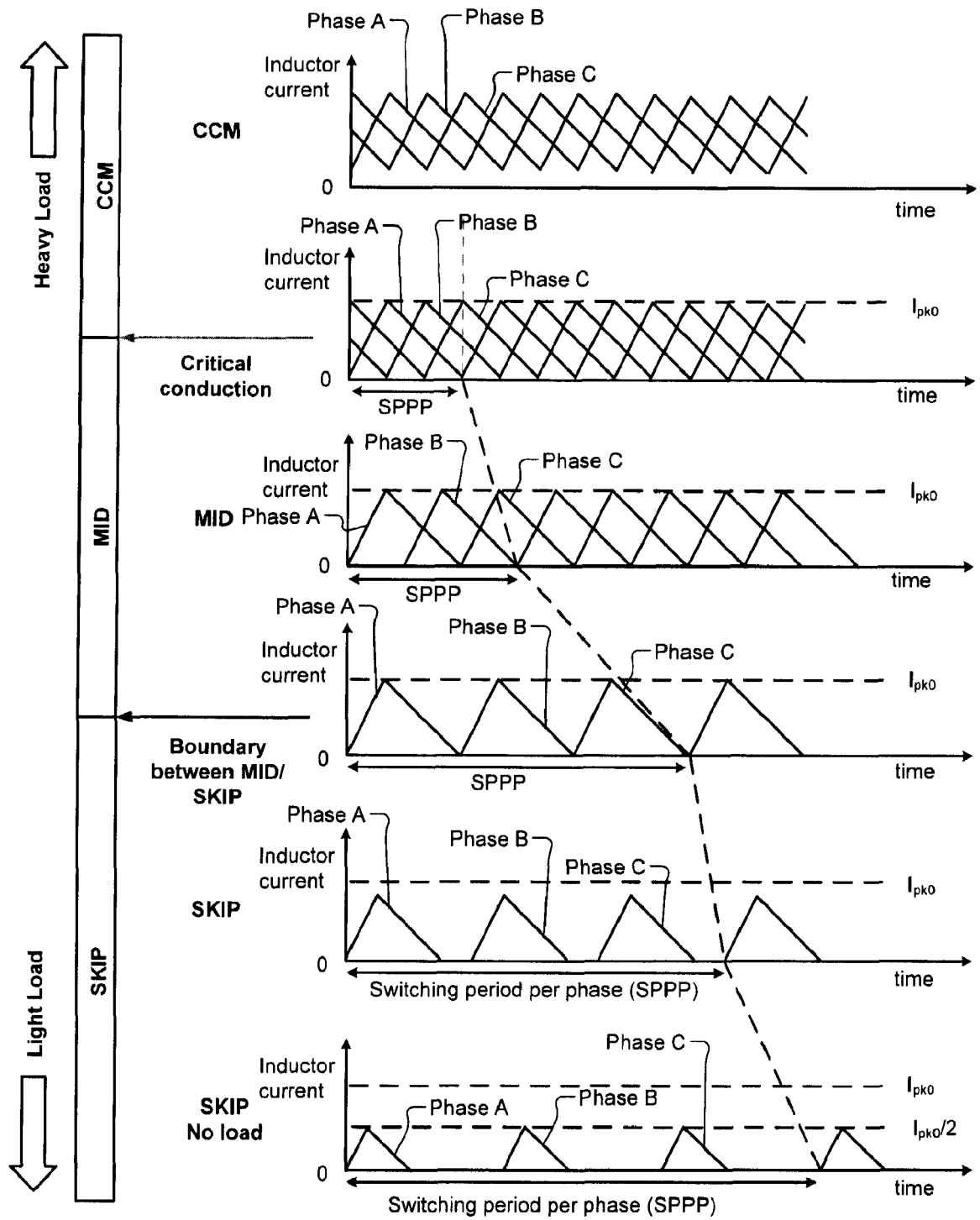

Referring now to FIGS. 9A and 9B, inductor current waveforms for multiphase switching converters having high-efficiency option and low ripple option over a wide load range are shown. In FIG. 9A, the high-efficiency option provides the following benefits: high efficiency, better efficiency versus ripple trade-off, and no transient. As load decreases from heavy load condition at the top, at critical conduction (boundary between CCM and medium load (MID) region), the inductor current valley approaches zero. As load decreases further, at medium load (in the MID region), the peak inductor current is constant, and the switching frequency is variable. At the boundary between medium load and light load (MID/SKIP region), inductor current is non-overlapping. At light load (SKIP region), the peak inductor current (or on-time) is constant, and the switching frequency is variable (see the last set of waveforms shown at the bottom). In FIG. 9B, the low-ripple option provides the following benefits: smaller output voltage ripple at light load relative to the high-efficiency option (different trade-off in efficiency versus ripple) and no transient. The efficiency, however, is low at light load. After entering SKIP mode, peak inductor current $I_{pk}$ can be reduced (e.g., to $I_{pk}/2$) to reduce ripple as shown (see the last set of waveforms shown at the bottom).

Figure 10:
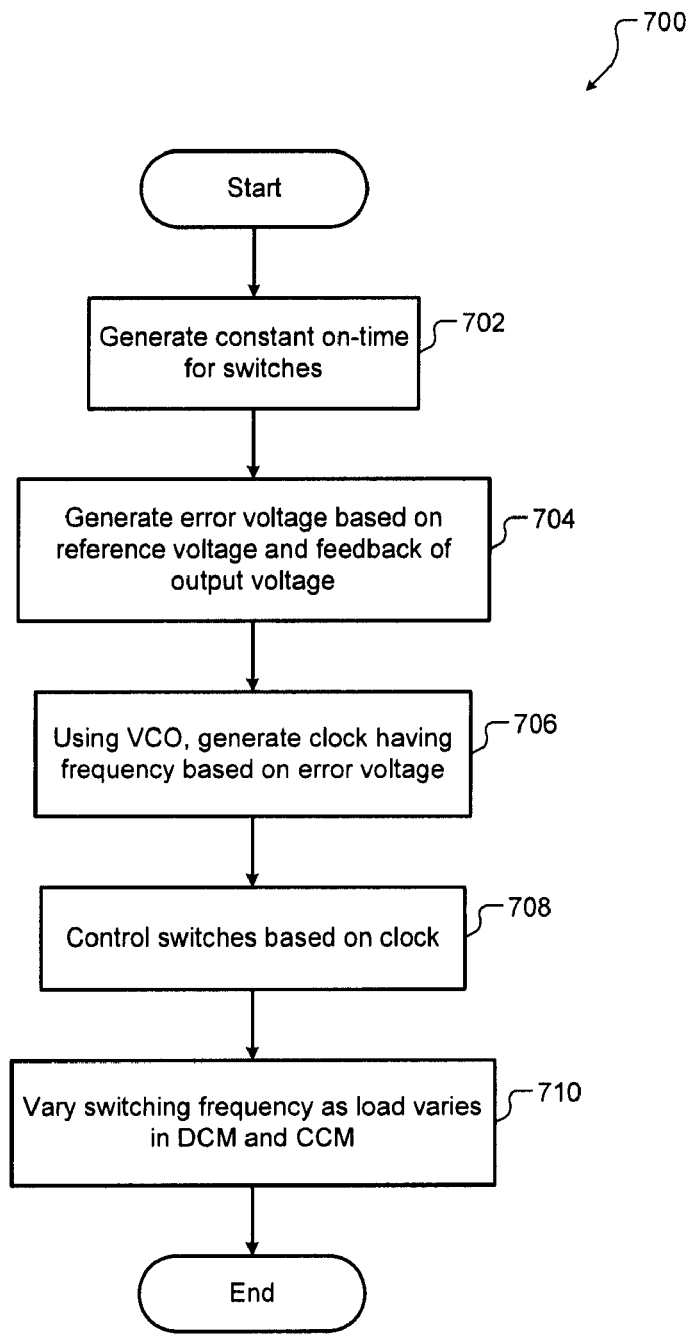
FIG. 10 is a flowchart of a method for operating a multiphase switching converter using a VCO mode control with constant on-time and variable frequency.

Referring now to FIG. 10, a method 700 for operating a multiphase switching converter using a VCO mode control with constant on-time and variable frequency is shown. At 702, control generates a constant on-time for the switches of the multiphase switching converter. At 704, control generates an error voltage based on a reference voltage and a feedback of the output voltage of the multiphase switching converter. At 706, using a VCO, control generates a clock having a frequency based on the error voltage. At 708, the switches of the multiphase switching converter are controlled based on the clock. At 710, control varies a switching frequency of the switches as load varies in DCM and CCM modes.

Figure 11:
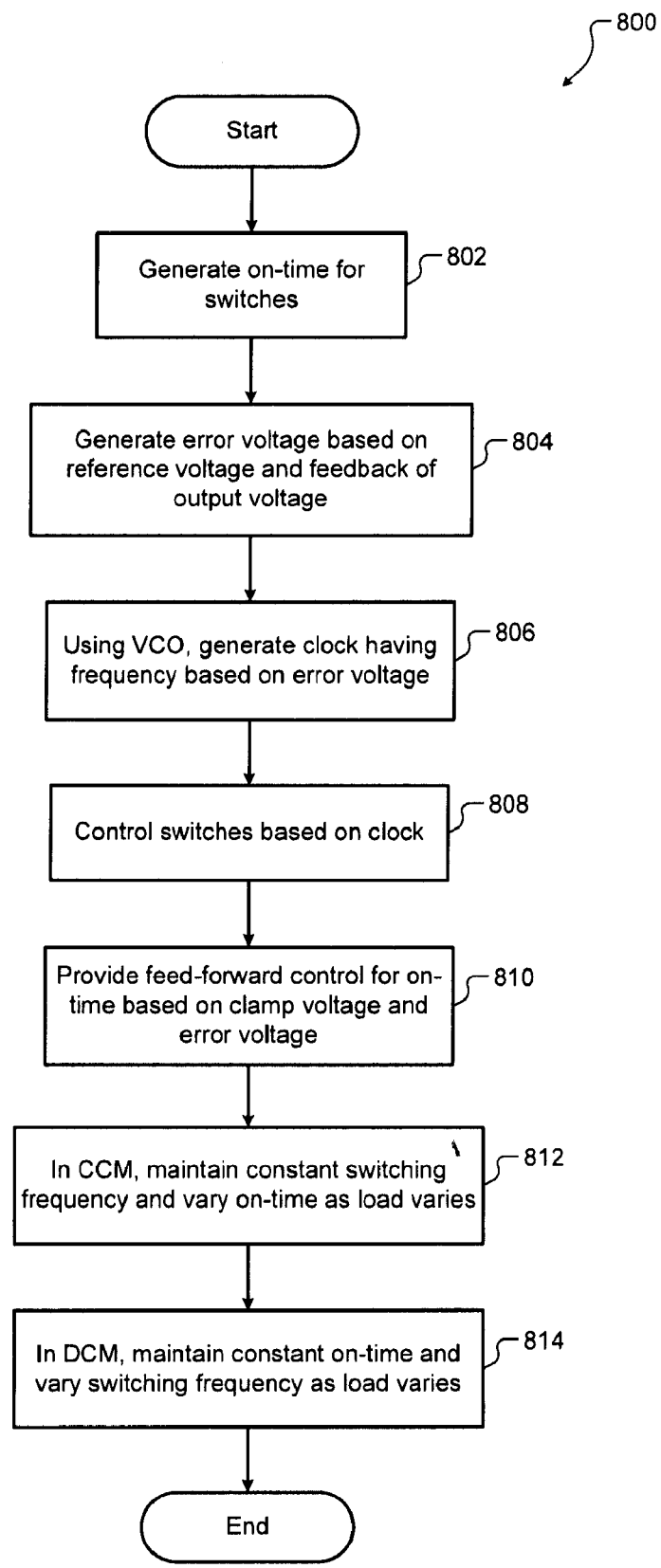
FIG. 11 is a flowchart of a method for operating a multiphase switching converter using a VCO mode control with on-time adjustment in CCM region.

Referring now to FIG. 11, a method 800 for operating a multiphase switching converter using a VCO mode control with on-time adjustment in CCM region is shown. At 802, control generates an on-time for the switches of the multiphase switching converter. At 804, control generates an error voltage based on a reference voltage and a feedback of the output voltage of the multiphase switching converter. At 806, using a VCO, control generates a clock having a frequency based on the error voltage. At 808, the switches of the multiphase switching converter are controlled based on the clock.

At 810, control provides a feed-forward control for the on-time of the switches based on a clamp voltage and the error voltage. At 812, in CCM, control maintains a constant switching frequency and varies the on-time of the switches as the load varies. At 814, in DCM, control maintains a constant on-time and varies the switching frequency of the switches as the load varies.

Figure 12:
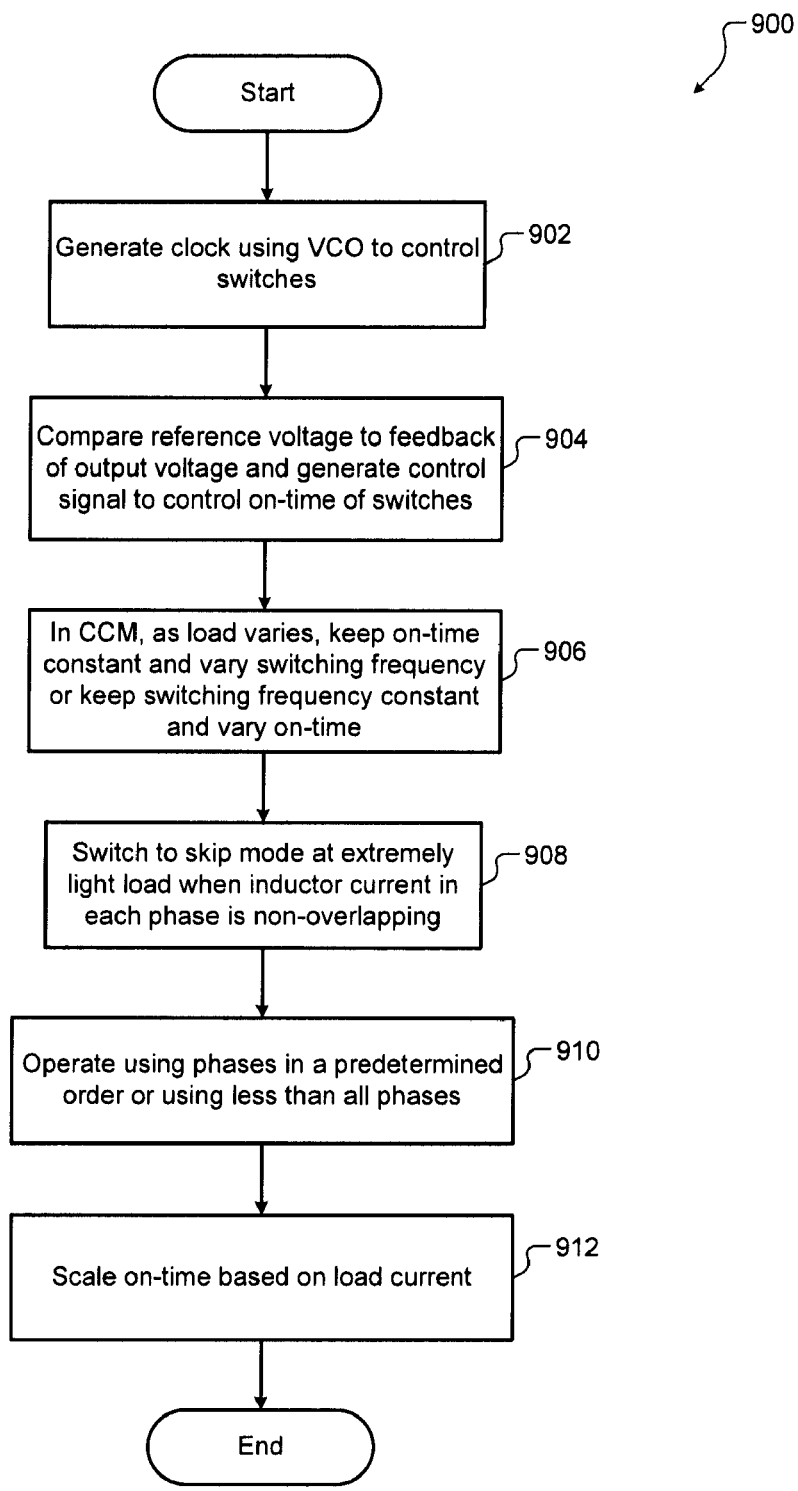
FIG. 12 is a flowchart of a method for operating a multiphase switching converter using a VCO mode control with SKIP mode at extremely light loads.

Referring now to FIG. 12, a method 900 for operating a multiphase switching converter using a VCO mode control with SKIP mode at extremely light loads is shown. At 902, control generates a clock using a VCO to control the switches of the multiphase switching converter. At 904, control compares a reference voltage to a feedback of the output voltage of the multiphase switching converter to control the on-time of the switches of the multiphase switching converter. At 906, in CCM, as the load varies, control keeps the on-time of the switches constant and varies a switching frequency of the switches, or control keeps the switching frequency of the switches constant and varies the on-time of the switches.

At 908, control switches the operation of the multiphase switching converter to SKIP mode at extremely light load when the inductor current in each phase is non-overlapping. At 910, control operates the multiphase switching converter using the phases in a predetermined order or using fewer than all the phases. At 912, control scales the on-time of the switches based on the load current.

Figure 13:
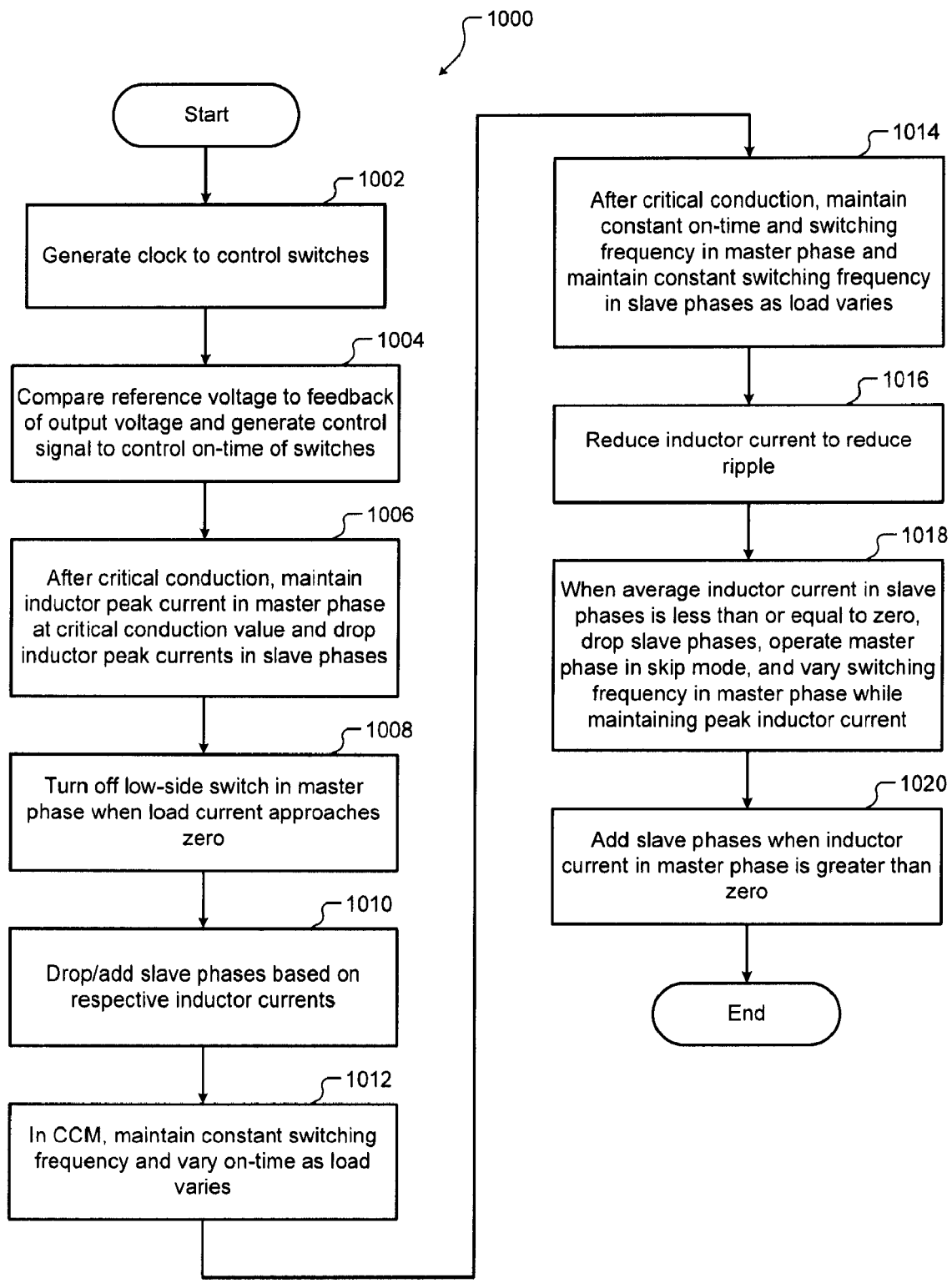
FIG. 13 is a flowchart of a method for operating a multiphase switching converter using a master/slave control.

Referring now to FIG. 13, a method 1000 for operating a multiphase switching converter using a master/slave control is shown. At 1002, control generates a clock to control the switches of the multiphase switching converter. At 1004, control compares a reference voltage to a feedback of the output voltage of the multiphase switching converter and generates a control signal to control the on-time of the switches.

At 1006, after critical conduction, control maintains the inductor peak current in the master phase at the same value as at critical conduction and drops the inductor peak currents in the slave phases of the multiphase switching converter. At 1008, control turns off the low-side switch in the master phase when the load current approaches zero. At 1010, control drops/adds the slave phases based on the inductor currents of the slave phases.

At 1012, in CCM, control maintains a constant switching frequency and varies the on-time of the switches as the load varies. At 1014, after critical conduction, control maintains constant on-time and switching frequency in the master phase and maintains a constant switching frequency in the slave phases as the load varies. At 1016, control reduces the inductor current to reduce ripple.

At 1018, when the average inductor current in the slave phases is less than or equal to zero, control drops the slave phases, operates the master phase in SKIP mode, and varies the switching frequency of the switches in the master phase while maintaining the peak inductor current constant. At 1020, control adds the slave phases when the inductor current in the master phase is greater than zero.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a multi-phase switching converter that receives an input voltage and that supplies an output voltage to a load via a plurality of phases, wherein each phase comprises:
a plurality of switches;
an on-time generator module that determines an on-time of the switches;
a switch control module that controls a switching frequency of the switches based on the on-time and a clock signal; and
an inductance that connects the switches to the load;
a converter control module that varies the switching frequency without varying the on-time or varies the on-time without varying the switching frequency when current through the load varies,
an error amplifier that generates an error voltage based on a reference voltage and the output voltage; and
a voltage controlled oscillator that generates the clock signal having a frequency based on the error voltage;
wherein the switching frequency is based on the frequency of the clock signal; and
wherein the converter control module comprises an on-time control module that generates a feed-forward control for the on-time based on the error voltage and a clamping voltage, wherein the clamping voltage is equal to the error voltage at critical conduction.

2. The system of claim 1, wherein when the multi-phase switching converter operates in a continuous conduction mode or in a discontinuous conduction mode, the converter control module varies the switching frequency without varying the on-time as current through the load varies.

3. The system of claim 1 wherein:
when the multi-phase switching converter operates in a continuous conduction mode, the converter control module varies the on-time without varying the switching frequency as current through the load varies; and
when the multi-phase switching converter operates in a discontinuous conduction mode, the converter control module varies the switching frequency without varying the on-time as current through the load varies.

4. The system of claim 1 wherein when the multi-phase switching converter operates in a continuous conduction mode:
the converter control module varies the switching frequency without varying the on-time as current through the load varies; or
the converter control module varies the on-time without varying the switching frequency as current through the load varies.

5. A system comprising:
a multi-phase switching converter that receives an input voltage and that supplies an output voltage to a load via a plurality of phases, wherein each phase comprises:
  a plurality of switches;
  an on-time generator module that determines an on-time of the switches;
  a switch control module that controls a switching frequency of the switches based on the on-time and a clock signal; and
  an inductance that connects the switches to the load; and
a converter control module that varies the switching frequency without varying the on-time or varies the on-time without varying the switching frequency when current through the load varies;
wherein the converter control module comprises:
  a voltage controlled oscillator that generates the clock signal having a frequency, wherein the switching frequency is based on the frequency of the clock signal;
  a comparator that compares the output voltage to a reference voltage and that generates a control signal based on the comparison, wherein the control signal determines the on-time; and
  a mode control module that switches mode of the multi-phase switching converter to a skip mode where current through the load is less than or equal to a predetermined value when currents through the inductances of the plurality of phases are non-overlapping.

6. The system of claim 5 wherein:
the converter control module operates the multi-phase switching converter using the phases in a predetermined order; or
the converter control module operates the multi-phase switching converter using less than all of the phases.

7. The system of claim 5 wherein the on-time generator module scales the on-time based on current through the load.

8. A system comprising:
a multi-phase switching converter that receives an input voltage and that supplies an output voltage to a load via a plurality of phases, wherein each phase comprises:
  a plurality of switches;
  an on-time generator module that determines an on-time of the switches;
  a switch control module that controls a switching frequency of the switches based on the on-time and a clock signal; and
  an inductance that connects the switches to the load; and
a converter control module that varies the switching frequency without varying the on-time or varies the on-time without varying the switching frequency when current through the load varies;
an oscillator that generates the clock signal having a frequency, wherein the switching frequency is based on the frequency of the clock signal; and
an error amplifier that generates an error voltage based on a reference voltage and the output voltage,
wherein the on-time generator module determines the on-time based on the error voltage;
wherein one of the plurality of phases is a master phase, and wherein others of the plurality of phases are slave phases; and
wherein after critical conduction, the converter control module maintains current through the inductance of the master phase at a critical conduction value and reduces current through the inductances of the slave phases.

9. The system of claim 8 wherein the master phase comprises a current detection module that detects current through the load and that turns off one of the plurality of switches when the current approaches zero.

10. The system of claim 8 further comprising a phase drop/add module that drops/adds the slave phases based on respective inductor currents.

11. The system of claim 8 wherein when the multi-phase switching converter operates in a continuous conduction mode, the converter control module varies the on-time without varying the switching frequency as current through the load varies.

12. The system of claim 8 wherein after critical conduction, the converter control module maintains the on-time and the switching frequency in the master phase and maintains the switching frequency in the slave phases as current through the load varies.

13. The system of claim 8 wherein the converter control module reduces peak inductor current to reduce ripple.

14. The system of claim 8 wherein when an average inductor current in the slave phases is less than or equal to zero, the converter control module (i) drops the slave phases, (ii) operates the master phase in a skip mode where current through the load is less than or equal to a predetermined value, and (iii) varies the switching frequency of the switches in the master phase as current through the load varies while maintaining peak inductor current.

15. The system of claim 14 wherein the converter control module adds the slave phases when inductor current in the master phase is greater than zero.

16. A method comprising:
supplying an output voltage to a load via a plurality of phases of a multi-phase switching converter, wherein each phase comprises a plurality of switches and an inductance connecting the switches to the load;
determining an on-time of the switches;
controlling a switching frequency of the switches based on the on-time and a clock signal;
varying the switching frequency without varying the on-time or varying the on-time without varying the switching frequency when current through the load varies;
generating an error voltage based on a reference voltage and the output voltage;
generating the clock signal having a frequency based on the error voltage;
determining the switching frequency based on the frequency of the clock signal; and
generating a feed-forward control for the on-time based on the error voltage and a clamping voltage, wherein the clamping voltage is equal to the error voltage at critical conduction.

17. The method of claim 16 further comprising varying the switching frequency without varying the on-time as current through the load varies when the multi-phase switching converter operates in a continuous conduction mode or in a discontinuous conduction mode.

18. The method of claim 16 further comprising:
varying the on-time without varying the switching frequency as current through the load varies when the multi-phase switching converter operates in a continuous conduction mode; and
varying the switching frequency without varying the on-time as current through the load varies when the multi-phase switching converter operates in a discontinuous conduction mode.

19. The method of claim 16 further comprising when the multi-phase switching converter operates in a continuous conduction mode:

varying the switching frequency without varying the on-time as current through the load varies; or varying the on-time without varying the switching frequency as current through the load varies.

20. The method comprising:

supplying an output voltage to a load via a plurality of phases of a multi-phase switching converter, wherein each phase comprises a plurality of switches and an inductance connecting the switches to the load;

determining an on-time of the switches;

controlling a switching frequency of the switches based on the on-time and a clock signal;

varying the switching frequency without varying the on-time or varying the on-time without varying the switching frequency when current through the load varies;

generating the clock signal having a frequency;

determining the switching frequency based on the frequency of the clock signal;

comparing the output voltage to a reference voltage;

generating a control signal based on the comparison;

determining the on-time based on the control signal; and switching mode of the multi-phase switching converter to a skip mode where current through the load is less than or equal to a predetermined value when currents through the inductances of the plurality of phases are non-overlapping.

21. The method of claim 20 further comprising:

operating the multi-phase switching converter using the phases in a predetermined order; or operating the multi-phase switching converter using less than all of the phases.

22. The method of claim 20 further comprising scaling the on-time based on current through the load.

23. A method comprising:

supplying an output voltage to a load via a plurality of phases of a multi-phase switching converter, wherein each phase comprises a plurality of switches and an inductance connecting the switches to the load;

determining an on-time of the switches;

controlling a switching frequency of the switches based on the on-time and a clock signal;

varying the switching frequency without varying the on-time or varying the on-time without varying the switching frequency when current through the load varies;

wherein one of the plurality of phases is a master phase, and wherein others of the plurality of phases are slave phases, the method further comprising:

generating the clock signal having a frequency;

determining the switching frequency based on the frequency of the clock signal;

generating an error voltage based on a reference voltage and the output voltage;

determining the on-time based on the error voltage; and after critical conduction:

maintaining current through the inductance of the master phase at a critical conduction value; and reducing current through the inductances of the slave phases.

24. The method of claim 23 further comprising in the master phase:

detecting current through the load; and turning off one of the plurality of switches when the current approaches zero.

25. The method of claim 23 further comprising dropping/adding the slave phases based on respective inductor currents.

26. The method of claim 23 further comprising varying the on-time without varying the switching frequency as current through the load varies when the multi-phase switching converter operates in a continuous conduction mode.

27. The method of claim 23 further comprising after critical conduction:

maintaining the on-time and the switching frequency in the master phase; and maintaining the switching frequency in the slave phases as current through the load varies.

28. The method of claim 23 further comprising reducing peak inductor current to reduce ripple.

29. The method of claim 23 further comprising when an average inductor current in the slave phases is less than or equal to zero:

dropping the slave phases;

operating the master phase in a skip mode where current through the load is less than or equal to a predetermined value; and varying the switching frequency of the switches in the master phase as current through the load varies while maintaining peak inductor current.

30. The method of claim 29 further comprising adding the slave phases when inductor current in the master phase is greater than zero.

* * * * *